(12) United States Patent
Toba et al.

(10) Patent No.: US 12,459,444 B2
(45) Date of Patent: Nov. 4, 2025

(54) GUIDE CAM DEVICE, AND ON-BOARD DEVICE USING THE GUIDE CAM DEVICE

(71) Applicant: ALPS ALPINE CO., LTD., Tokyo (JP)

(72) Inventors: Kimio Toba, Fukushima (JP); Jun Taniguchi, Fukushima (JP)

(73) Assignee: ALPS ALPINE CO., LTD., Tokyo (JP)

( * ) Notice: Subject to any disclaimer, the term of this patent is extended or adjusted under 35 U.S.C. 154(b) by 0 days.

(21) Appl. No.: 18/609,701

(22) Filed: Mar. 19, 2024

(65) Prior Publication Data

US 2024/0336208 A1    Oct. 10, 2024

(30) Foreign Application Priority Data

Apr. 5, 2023  (JP) ................ 2023-061706

(51) Int. Cl.
*F16H 53/00*   (2006.01)
*B60R 11/02*   (2006.01)
*B60R 11/00*   (2006.01)

(52) U.S. Cl.
CPC .......... *B60R 11/0235* (2013.01); *F16H 53/00* (2013.01); *B60R 2011/0005* (2013.01); *B60R 2011/005* (2013.01)

(58) Field of Classification Search
CPC .............. H01R 13/629; H01R 11/0235; F16M 2200/028; F16M 11/425; F16M 11/048
USPC ............................................................. 74/20
See application file for complete search history.

(56) References Cited

U.S. PATENT DOCUMENTS 7,179,104 B2    2/2007  Wada et al.

FOREIGN PATENT DOCUMENTS

| JP | 2515844 U | 10/1996 |
| JP | 2006-286270 | 10/2006 |
| JP | 2014-097150 | 5/2014 |
| JP | 2014097150 A * | 5/2014 |

OTHER PUBLICATIONS

1 Extended European Search Report for 24168006.5 mailed on Sep. 4, 2024.

* cited by examiner

*Primary Examiner* — Gregory Robert Weber
(74) *Attorney, Agent, or Firm* — IPUSA, PLLC (57) ABSTRACT

A guide cam device includes a cam groove, a projection, and a restriction member. The cam groove includes: first, second, and third grooves, the second and third grooves branching forward from the first groove; and a locking recess positioned between a forward end of the second groove and a forward end of the third groove. The projection is configured to move forward and backward in the cam groove and enter a locked state upon entering the locking recess. The restriction member is configured to inhibit entry of the projection from the first groove to the third groove and permit the projection to advance from the first groove to the second groove. In response to being pushed by the projection that exits the locking recess and moves backward in the third groove, the restriction member is deformed or moved to enable the projection to move to the first groove.

6 Claims, 5 Drawing Sheets

GUIDE CAM DEVICE, AND ON-BOARD DEVICE USING THE GUIDE CAM DEVICE

CROSS-REFERENCE TO RELATED APPLICATIONS

The present application is based on and claims priority to Japanese Patent Application No. 2023-061706 filed on Apr. 5, 2023, the entire contents of which are hereby incorporated by reference.

BACKGROUND

1. Field of the Invention

The present disclosure relates to: a guide cam device in which a projection serving as a follower moves in a cam groove to enter a locked state without forming a step on the bottom surface of the cam groove; and an on-board device using the guide cam device.

2. Description of the Related Art

Japanese Utility Model Registration No. 2515844 illustrates guide cam devices in FIG. 3 and FIG. 5. According to the guide cam device as illustrated in FIG. 5, a guide pin moves in a heart-shaped groove, and is locked in the groove during the course of movement thereof. A heart cam is provided with an irreversible step on the bottom surface of the groove, and the guide pin is biased to the bottom surface of the groove by a spring, and the guide pin can move in a fixed direction. The guide cam device as illustrated in FIG. 3 uses a guide pin having a hexagonal cross section, and a loop-shaped groove having an inclined surface or an angular recess. The guide pin having the hexagonal cross section slides in the groove, and can move in a fixed direction or can be locked.

The guide cam device described in Japanese Patent Publication No. 2006-286270 uses a heart cam that is free of a step at the bottom surface of the cam. The heart cam is configured such that the lower end in the drawings is rotatably supported, and the upper end of the heart cam is constantly pulled upward by a spring so that the heart cam is maintained in an upright posture. The projection moving in the heart cam is constantly urged downward by a spring. When the projection is positioned in a recess in the heart cam, a downward movement of the projection is restricted. After the projection exits the recess upward, the projection can move downward. Because the heart cam receives a biasing force of a spring that is to keep the heart cam upright, the projection can move in the heart cam in a fixed direction when the projection moves upward and downward.

The guide cam device as illustrated in FIG. 5 of Japanese Utility Model Registration No. 2515844 is troublesome in processing the groove having the step, as described in paragraph. During operation, a user feels a drop of the guide pin into the step, resulting in poor operation feelings. Furthermore, the above guide cam device generates an impact sound every time the guide pin drops into the step. This impact sound is generated multiple times while the guide pin goes back and forth once in the guide cam. Thus, this guide cam device is not suitable for being mounted in devices requiring silence, such as on-board devices and the like. The guide cam device illustrated in FIG. 3 of Japanese Utility Model Registration No. 2515844 has a complicated conformation in which the hexagonal guide pin moves in the loop-shaped groove. Thus, processing cost thereof is high. In addition, the hexagonal guide pin slides in a state in which one of the side surfaces of the hexagonal guide pin is constantly in contact, as a plane, with the inner wall of the groove. Therefore, friction resistance during movement of the guide pin increases, and it is challenging to move the guide pin smoothly.

In the guide cam device described in Japanese Patent Publication No. 2006-286270, when, for example, an impact is applied thereto from the exterior during operation, the heart cam biased by the spring may vibrate and cause a malfunction in which the projection cannot follow a correct path of movement.

SUMMARY

According to an aspect of the present disclosure, a guide cam device includes a cam groove, a projection, and a restriction member. The cam groove includes: a first groove, a second groove, and a third groove, the second groove and the third groove branching forward from the first groove; and a locking recess positioned between a forward end of the second groove and a forward end of the third groove. The projection is configured to move forward and backward in the cam groove and enter a locked state upon entering the locking recess. The restriction member is configured to inhibit entry of the projection from the first groove to the third groove and permit the projection to advance from the first groove to the second groove. In response to being pushed by the projection that exits the locking recess and moves backward in the third groove, the restriction member is deformed or moved to enable the projection to move to the first groove.

The guide cam device of the present disclosure is preferably such that a biasing force is applied to the cam groove or the projection in a direction in which the projection is pushed from the second groove toward the third groove.

The guide cam device of the present disclosure is preferably such that the first groove and the third groove are continuous in a straight line, and the second groove includes an inclined portion that is inclined in a direction away from the third groove as the projection advances.

In the guide cam device of the present disclosure, the restriction member is, for example, an elastically deformable spring member.

The guide cam device of the present disclosure may be configured such that no step is formed on the bottom surface of the cam groove.

According to another aspect of the present disclosure, an on-board device includes a stationary portion, a movable portion, and any one of the above-described guide cam devices between the stationary portion and the movable portion. The movable portion is movable forward and backward along the stationary portion. In response to the movable portion moving forward, the projection enters the locking recess and the movable portion enters a locked state.

DETAILED DESCRIPTION

It is an object of the present disclosure to provide: a guide cam device that can address the above existing issues; and an on-board device using the guide cam device. Specifically, the guide cam device provided in the present disclosure is configured to reliably move a projection to a lockable position in a cam groove without forming a step on the bottom surface of the cam groove. In addition, this guide cam device can suppress generation of a sound while the projection is moving in the cam groove.

Figure 1:
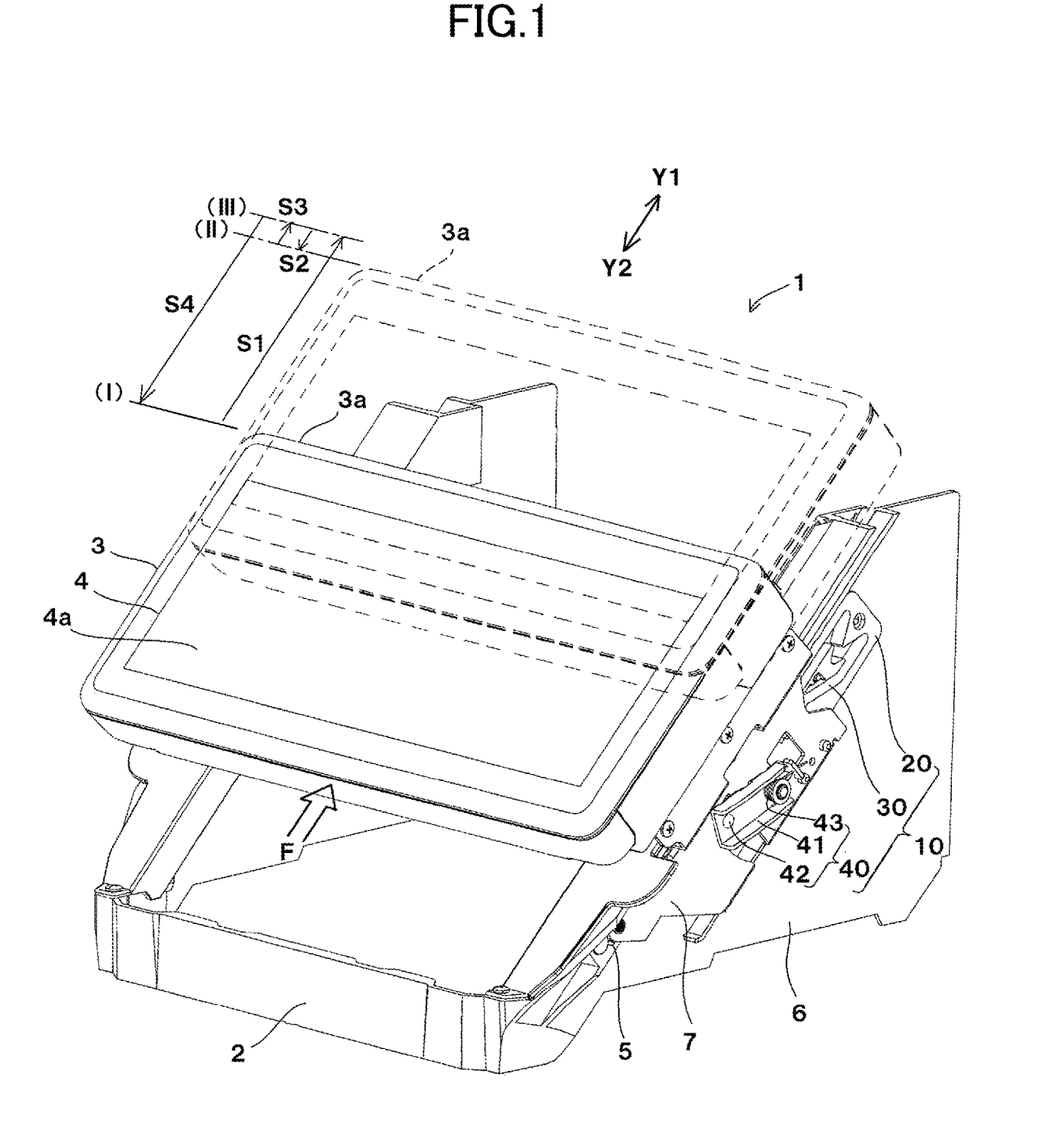
FIG. 1 is a perspective view illustrating a structure of a main portion of an on-board device according to an embodiment of the present disclosure.

FIG. 1 illustrates a main portion of an on-board display device 1 that is an embodiment of the on-board device. The on-board display device 1 includes a stationary portion 2 and a movable portion 3. The stationary portion 2 is fixed to an instrument panel or the interior of a dashboard in the cab of an automobile, and the movable portion 3 appears on the surface of the instrument panel or the dashboard. A display device 4 is mounted in the movable portion 3. A display screen 4a of the display device 4 is oriented to the cab. A guide mechanism 5 is provided between the stationary portion 2 and the movable portion 3. The guide mechanism 5 is configured to enable the movable portion 3 to linearly move forward (Y1 direction) and backward (Y2 direction) (plane movement). The movable portion 3 is constantly biased to move backward (Y2 direction) by its own weight. In addition, a spring member, such as a coil spring, configured to pull the movable portion 3 backward may be provided, and the movable portion 3 may be biased backward (Y2 direction) by both its own weight and a force applied by the spring member.

Figure 2:
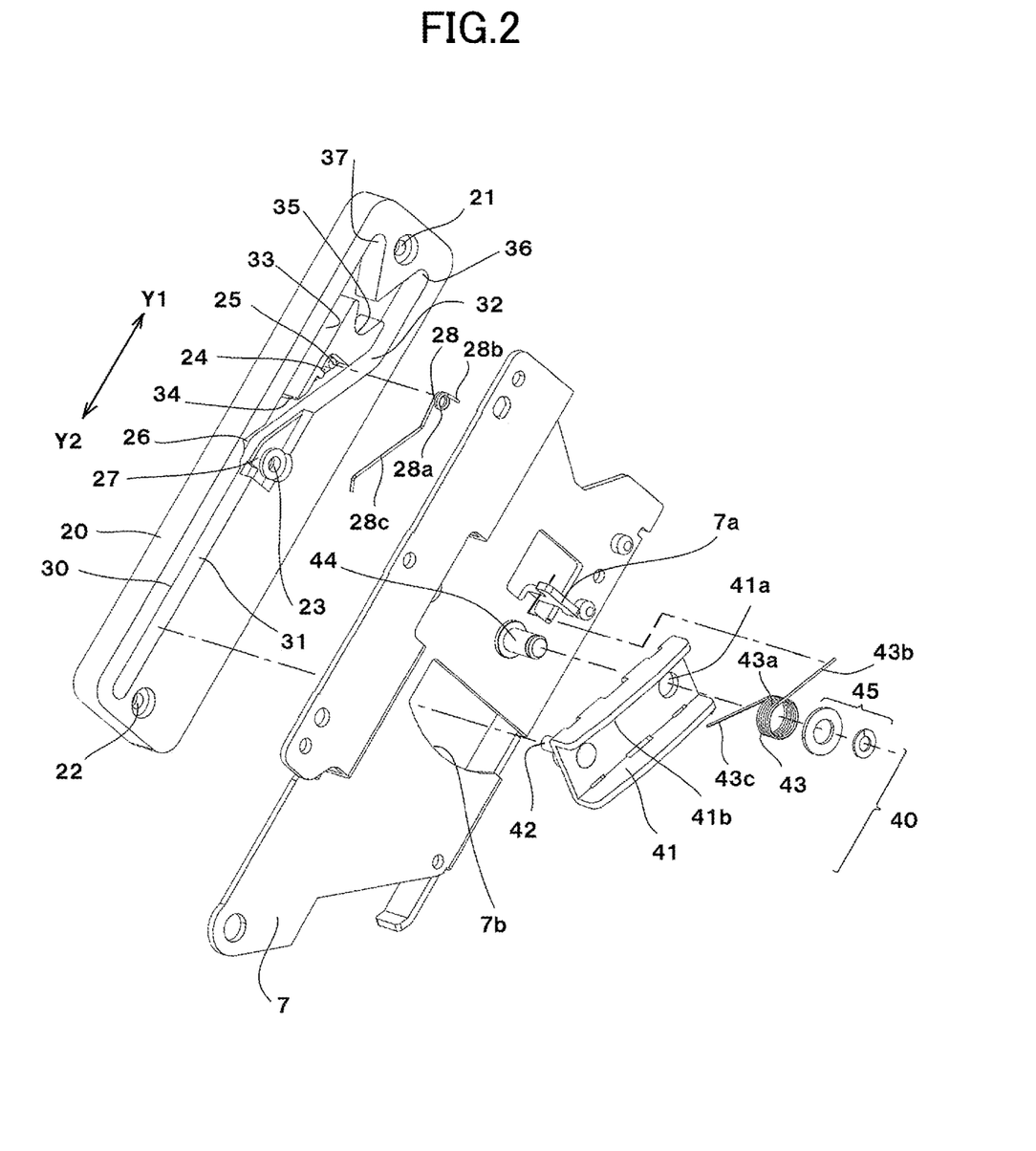
FIG. 2 is an exploded view illustrating components of a guide cam device mounted in the on-board device illustrated in FIG. 1.

A guide cam device 10 is interposed between the stationary portion 2 and the movable portion 3. As illustrated in FIG. 1 and FIG. 2, the guide cam device 10 includes: a cam member 20 provided in a stationary chassis 6, which is a portion of the stationary portion 2; and a follower member 40 provided in a movable chassis 7, which is a portion of the movable portion 3. As illustrated in FIG. 1, in accordance with the operation of the guide cam device 10, a forward portion 3a of the movable portion 3 can stop at position (I) indicated by a solid line and position (II) indicated by a dashed line. Position (I) is a receding position of the movable portion 3, and position (II) is an advancing locking position of the movable portion 3. The on-board display device 1 is used, for example, with an instrument panel or dashboard having an opening. The opening is closed when the movable portion 3 is located at receding position (I), and the opening is opened when the movable portion 3 moves to advancing locking position (II). The interior of the opening is used as a pocket for housing small items or as a housing for an acoustic device or a communication device to which various electronic media, such as a disk, a USB memory, and the like, are loaded.

The on-board device of the present disclosure is not limited to the on-board display device 1 in which the display device 4 is mounted in the movable portion 3. The on-board device of the present disclosure may be any other device as long as the movable portion 3 is included. Also, the guide cam device 10 of an embodiment of the present disclosure is mountable in various devices other than the on-board devices. For example, the guide cam device 10 is mountable in a push switch, a memory card-loading device, or the like.

As illustrated in FIG. 2 to FIG. 5, the cam member 20 is a rectangular shape with longer sides oriented in a forward-backward direction (Y1-Y2 direction) and is formed of a synthetic resin material or a metal material. Fixing holes 21, 22, and 23 are formed in three places of the cam member 20, and the cam member 20 is fixed to the stationary chassis 6 by fixing screws inserted into the fixing holes 21, 22, and 23.

A cam groove 30 is formed in the surface of the cam member 20 facing the movable chassis 7. The cam groove 30 includes: a first groove 31 extending in the form of a straight line in the forward-backward direction (Y1-Y2 direction); and a second groove 32 and a third groove 33 branching forward from a branched portion 34 that is a forward end of the first groove 31. The third groove 33 extends in the form of a straight line in the forward-backward direction continuously with the first groove 31. The second groove 32 includes an inclined portion that is gradually inclined away from the third groove 33 as the second groove 32 goes forward (Y1 direction) from the branched portion 34. A locking recess 35 recessed backward is formed between a forward end 32a of the second groove 32 and a forward end 33a of the third groove. An advancing path terminal 36 is formed forward of the forward end 32a of the second groove 32, and a receding path terminal 37 is formed forward of the forward end 33a of the third groove 33. An advancing path inclined portion 38 is formed from the advancing path terminal 36 toward the locking recess 35, and a receding path inclined portion 39 is formed from the receding path terminal 37 toward the locking recess 35.

Figure 3:
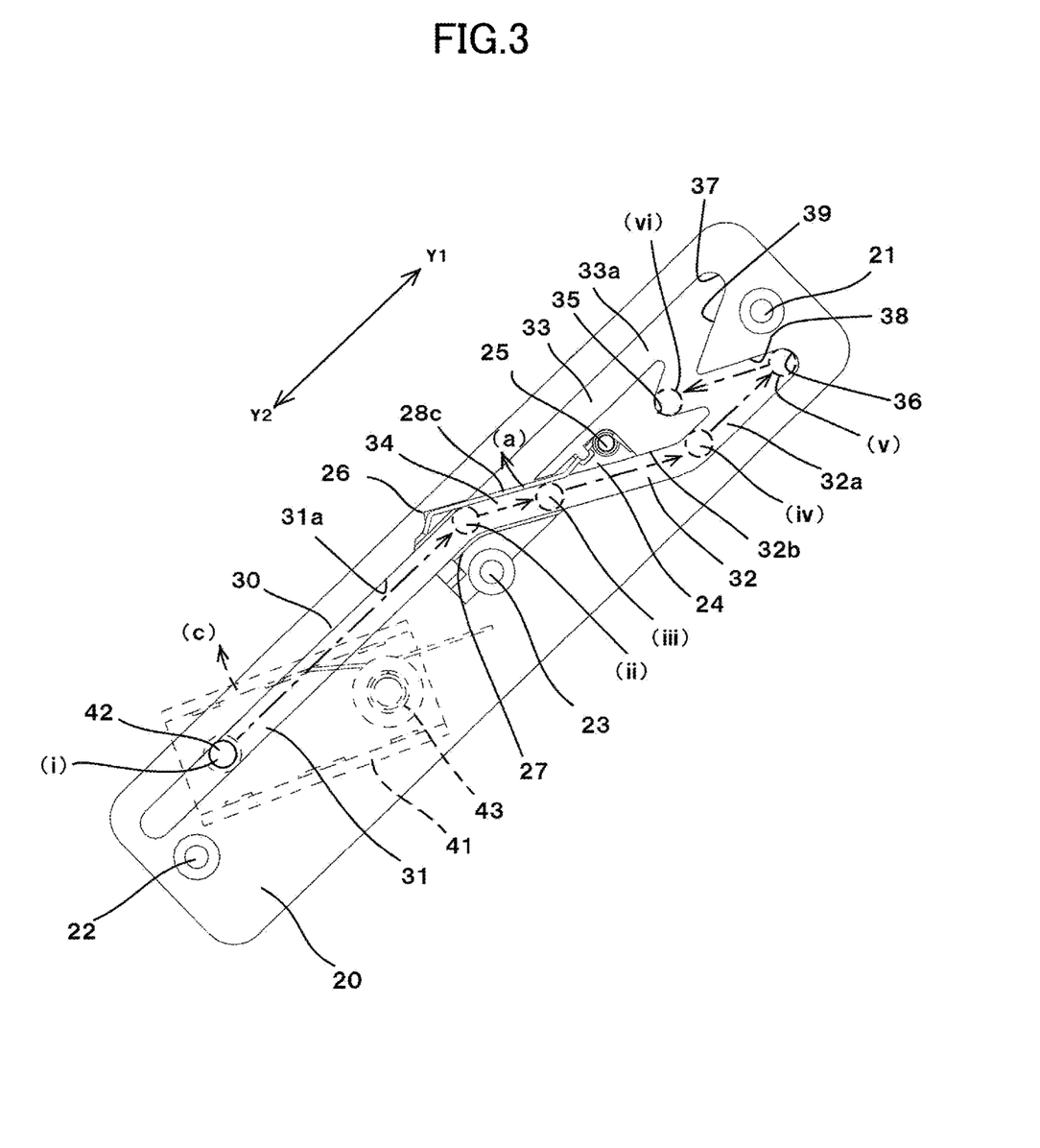
FIG. 3 is a side view illustrating an operation of the guide cam device, specifically, a state in which a projection is returned backward.

As illustrated in FIG. 2 and FIG. 3, a supporting recess 24 is formed between the second groove 32 and the third groove 33 in the cam member 20, and the supporting recess 24 is opened toward the second groove 32. A supporting pin 25 is integrally formed in the supporting recess 24. A stopper recess 26 recessed laterally from the first groove 31 is formed in the branched portion 34 of the cam groove 30. A movable range recess 27 is formed in a place facing the stopper recess 26 via the first groove 31.

A restriction member 28 is provided in the branched portion 34 of the cam groove 30. The restriction member 28 is formed of a wire spring member (torsion spring member). The restriction member 28 includes a wire-wound portion 28a, a base end portion 28b extending from the wire-wound portion 28a, and a restriction portion 28c extending further from the wire-wound portion 28a than the base end portion 28b. The wire-wound portion 28a of the restriction member 28 is mounted in the supporting pin 25 in the supporting recess 24, and the base end portion 28b is disposed on the inner wall of the supporting recess 24. When the restriction portion 28c is biased in direction (a) as illustrated in FIG. 3 by the action of an elastic force of the torsion spring member, and no external force is applied to the restriction portion 28c, the tip of the restriction portion 28c is pressed against the inner wall of the stopper recess 26 formed laterally of the first groove 31. As illustrated in FIG. 3, when no external force is applied to the restriction member 28, the path from the first groove 31 to the third groove 33 is blocked in the branched portion 34 by the restriction portion 28c. Further, because the restriction portion 28c exists at the boundary between the first groove 31 and the second groove 32, a groove path continuous from the first groove 31 to the second groove 32 is formed.

As illustrated in FIG. 2, the follower member 40 includes: a biasing lever 41; a projection (follower projection) 42, serving as a follower, fixed to the biasing lever 41; and a biasing member 43 configured to apply a biasing force to the biasing lever 41. The supporting pin 44 fixed to the movable chassis 7 that is the portion of the movable portion 3 is inserted through a supporting hole 41a of the biasing lever 41, and a wire-wound portion 43a of the biasing member 43 that is a torsion spring member. A washer member 45 is attached to the tip of the supporting pin 44, thereby retaining the biasing lever 41 and the biasing member 43. One wire end 43b of the biasing member 43 is disposed on a spring hanging portion 7a bent at the movable chassis 7, and the other wire end 43c is disposed on an inner surface 41b of a lateral bent portion of the biasing lever 41. As a result, the biasing lever 41 is biased in direction (c) (clockwise) as illustrated in FIG. 3. The projection 42 is fixed at a position away from the supporting hole 41a in the biasing lever 41. The projection 42 passes through a cut-out portion 7b of the movable chassis 7 and is inserted into the cam groove 30 of the cam member 20. The projection 42 is a sliding pin formed of a synthetic resin or a metal and has a circular cross section. The diameter of the circular cross section of the projection 42 is smaller than groove widths of the first groove 31, the second groove 32, and the third groove 33, and is smaller than the groove widths over the entire region in the cam groove 30.

Next, the operation of the on-board display device 1 and the guide cam device 10 will be described. As illustrated by the solid line in FIG. 1, when the movable portion 3 of the on-board display device 1 is moved backward (Y2 direction) to receding position (I), the posture of the movable portion 3 becomes stable by its own weight or by both its own weight and the force applied by the spring member, such as a coil spring. When the movable portion 3 is located at receding position (I), in the guide cam device 10, the projection 42 serving as a follower is located at initial position (i) as illustrated in FIG. 3 in the first groove 31 of the cam groove 30. The biasing lever 41 receives a rotational biasing force in direction (c), with a portion supported by the supporting pin 44 as a fulcrum, by the action of a biasing force of the biasing member 43. The projection 42 is pushed by the rotational biasing force so as to advance from the second groove 32 toward the third groove 33. In the cam groove 30, when a direction in which the second groove 32 extends is denoted by a right-hand side and a direction in which the third groove 33 extends is denoted by a left-hand side, the projection 42 is constantly biased toward the left-hand side. Therefore, the projection 42 located at initial position (i) is pressed against an inner wall 31a of the first groove 31.

When the movable portion 3 located at receding position (I) as illustrated by the solid line in FIG. 1 is, for example, pushed by hand to apply a forward pressing force F to the movable portion 3, the movable portion 3 can be moved forward by distance S1 as illustrated in FIG. 1 to forward terminal position (III).

While the movable portion 3 moves from receding position (I) to the forward terminal position (III), the projection 42 moves forward from initial position (i) while sliding over the inner wall 31a of the first groove 31 by receiving the biasing force of the biasing member 43. As illustrated in FIG. 3, in the branched portion 34 of the cam groove 30, a path of entry to the third groove 33 is blocked by the restriction portion 28c of the restriction member 28. As a result, entry to the third groove 33 is inhibited, while movement toward the second groove 32 is permitted. The projection 42 moved to branched position (ii) as illustrated in FIG. 3 does not enter the third groove 33, and can slide over the restriction portion 28c and enter the second groove 32 as illustrated in position (iii). In the second groove 32, the projection 42 also slides over an inner wall 32b of the second groove 32. As illustrated in FIG. 3, when no external force is applied to the restriction member 28, the inner wall 31a of the first groove 31, the restriction portion 28c, and the inner wall 32b of the second groove 32 substantially function as a continuous guide portion. While being pressed against the inner wall 31a, the restriction portion 28c, and the inner wall 32b by the action of the biasing force of the biasing member 43, the projection 42 slides thereover from position (iii) to position (iv).

When the movable portion 3 is further pushed forward, the projection 42 exits the second groove 32 from position (iv). Subsequently, the projection 42 reaches advancing path forward end position (v) and contacts the advancing path terminal 36. As a result, the movable portion 3 cannot advance any more from forward terminal position (III). Immediately thereafter, when the pressing force F is released by removing the hand from the movable portion 3, the movable portion 3 moves backward by its own weight or by both its own weight and the force applied by the spring member. When the movable portion 3 recedes by distance S2 as illustrated in FIG. 1, the projection 42 moves from advancing path forward end position (v) to locking position (vi) at which the projection 42 is dropped into the locking recess 35. In this state, the movable portion 3 is locked at forward locking position (II). By the action of the biasing force of the biasing member 43, the projection 42 recedes while being pressed against the advancing path inclined portion 38 from advancing path forward end position (v). Thus, the projection 42 can enter the locking recess 35 without returning to the second groove 32.

Figure 4:
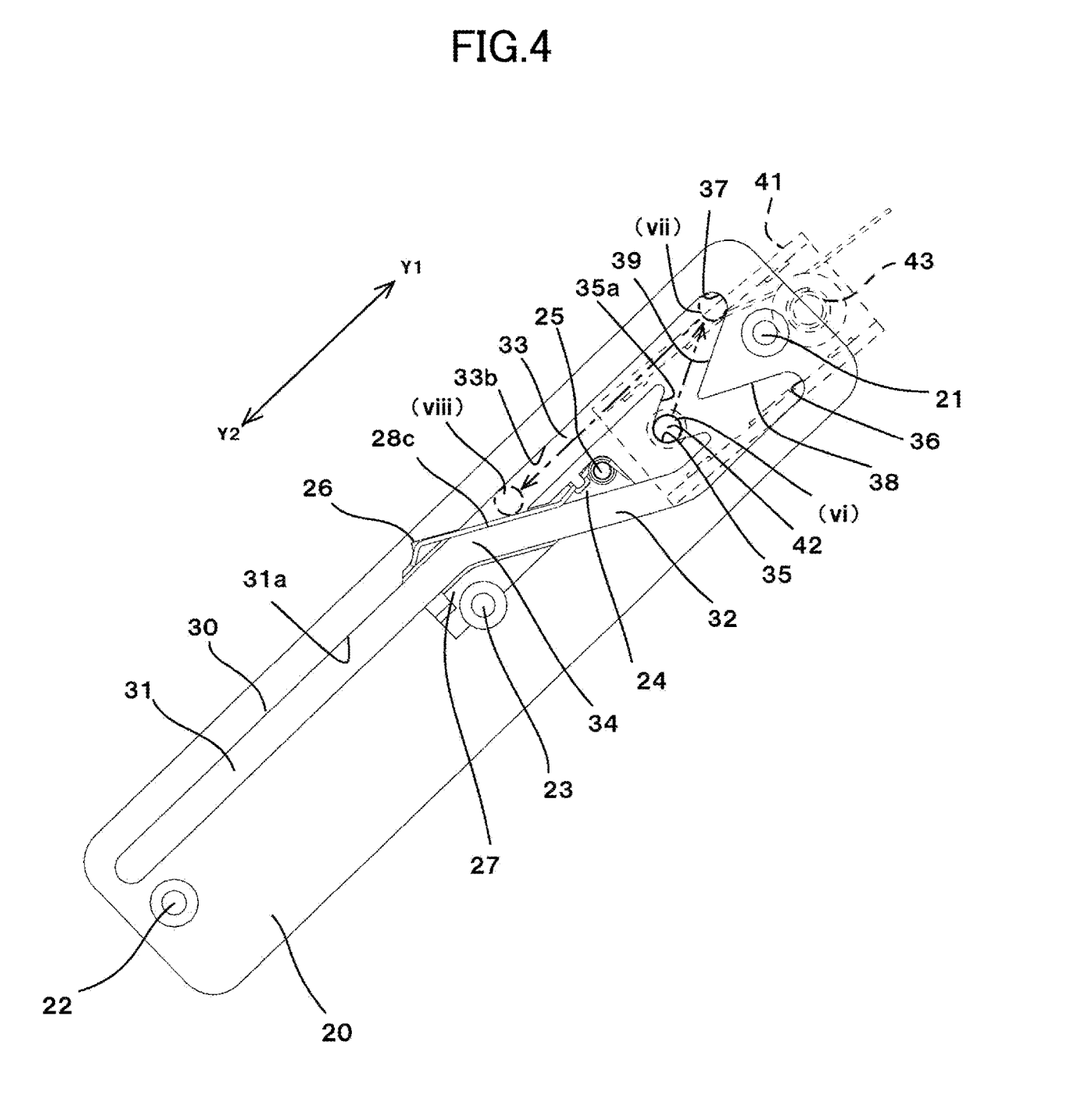
FIG. 4 is a side view illustrating the operation of the guide cam device, specifically, a state in which the projection moves forward and enters a locking recess.

When the pressing force F is applied again to the movable portion 3 located at forward locking position (II), the locked state of the movable portion 3 can be released and the movable portion 3 can be returned to receding position (I). When the movable portion 3 advances by distance S3 from forward locking position (II) by the action of the pressing force F, the projection 42 in the cam groove 30 advances from locking position (vi), and contacts the receding path terminal 37 and takes receding path forward end position (vii) as illustrated in FIG. 4. As a result, the movable portion 3 reaches forward terminal position (III) again. Because the projection 42 is biased in the direction from the second groove 32 toward the third groove 33, i.e., biased to the left-hand side, the projection 42 located at locking position (vi) can slide above an inner wall 35a of the locking recess 35 and enter the receding path terminal 37 with approximately no contact with the receding path inclined portion 39. Immediately after reaching forward terminal position (III), by removing the hand from the movable portion 3 to release the pressing force F, the movable portion 3 starts to move backward by its own weight or by both its own weight and the force applied by the spring member. Subsequently, the projection 42 enters the third groove 33 from receding path forward end position (vii). Because the projection 42 recedes while being pressed against the inner wall 33b of the third groove 33, the projection 42 can enter the third groove 33 without returning into the locking recess 35.

Figure 5:
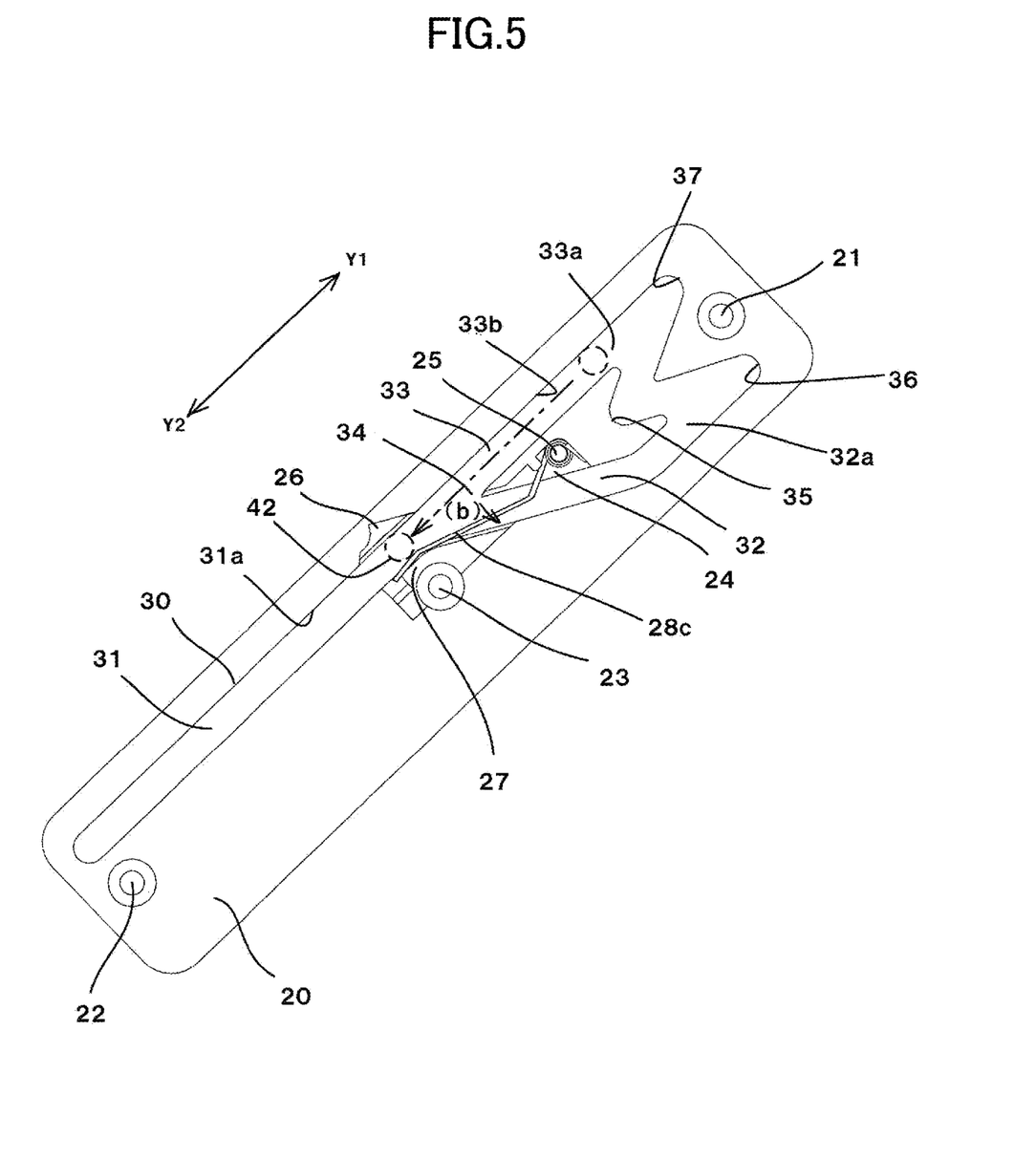
FIG. 5 is a side view illustrating the operation of the guide cam device, specifically, an operation in which the projection returns from a third groove to a first groove.

During backward movement of the movable portion 3, the projection 42 contacts the restriction portion 28c of the restriction member 28 at position (viii) as illustrated in FIG. 4. The torsion spring constituting the restriction member 28 is set to have a spring constant at which the torsion spring is deformable by a backward returning force of the movable portion 3. As illustrated in FIG. 5, the restriction portion 28c of the restriction member 28 is deformed in direction (b) by the action of the moving force of the projection 42, and the tip of the restriction portion 28c can be moved into the movable range recess 27. Therefore, the projection 42 can pass laterally of the deformed and moved restriction portion 28c and return into the first groove 31. When the movable portion 3 recedes by distance S4 as illustrated in FIG. 1 and returns to receding position (I), the projection 42 arrives at initial position (i) as illustrated in FIG. 3. Also, the restriction member 28 recovers elastically, and the path of entry from the first groove 31 to the third groove 33 is blocked by the restriction portion 28c.

In the guide cam device 10 of the embodiment, the projection 42 is constantly biased in direction (c) by the biasing member 43. Thus, when the projection 42 located at locking position (vi) advances, the projection 42 can enter the receding path terminal 37 without returning to the advancing path terminal 36, as illustrated in FIG. 4. However, for example, it can be expected that when the projection 42 located at locking position (vi) advances, the projection 42 will vibrate due to an externally applied impact or the like, and the projection 42 will mistakenly return to the second groove 32 from the advancing path terminal 36 without entering the receding path terminal 37. Even in this case, the projection 42 can pass laterally of the restriction portion 28c from the second groove 32 and return to the first groove 31. Therefore, after the movable portion 3 located at forward locking position (II) is pushed forward and the locking is released, the movable portion 3 can return to receding position (I) without fail.

The guide cam device 10 of the embodiment includes no step on the bottom surface of the cam groove 30. A user does not feel an impact generated when the projection 42 passes through a plurality of steps. That is, the guide cam device 10 can prevent generation of a plurality of impact sounds. The sound when the projection 42 moves in the cam groove 30 is generated only when the restriction member 28 recovers elastically as illustrated in FIG. 3 and FIG. 4 from the deformed state as illustrated in FIG. 5, and the restriction portion 28c contacts the stopper recess 26. This sound generated upon elastic recovery is much smaller than the impact sound generated when the projection 42 passes through the steps on the bottom surface of the cam groove. Further, the sound can be further reduced by providing a buffer material for reducing the impact when the restriction member 28 contacts the stopper recess 26 or by forming the restriction member 28 with a plastic spring.

The load when the projection 42 moves in the cam groove 30 is only the sliding friction between the projection 42, which is the sliding pin having the circular cross section, and the inner surface of the cam groove. Thus, the operating load of the guide cam device 10 becomes extremely small, and the movable portion 3 can be moved smoothly. Therefore, it is possible to reduce abrasion and the like of the projection 42 and the cam groove 30.

In the above embodiment, the cam member 20 is fixed to the stationary chassis 6, the biasing lever 41 to which the projection 42 is fixed is rotatably supported by the movable chassis 7, and the biasing lever 41 is biased in direction (c) by the biasing member 43. Conversely, the projection 42 may be fixed to the movable chassis 7, the cam member 20 may be rotatably supported with an axis located at the position of the fixing hole 21 as a fulcrum, and the cam member 20 may be biased counterclockwise by a biasing member, such as a torsion spring, whereby the projection 42 may be pushed toward the restriction portion 28c and the inner walls 31a, 32b, and 33b of the grooves 31, 32, and 33.

The cam member 20 may be provided to the movable chassis 7, and the follower member 40 may be provided to the stationary chassis 6.

The restriction member 28 is not limited to the wire spring member (torsion spring) as in the embodiment, but may be a plate-like spring member. Alternatively, the restriction portion 28c of the restriction member 28 may be formed of a thin plate, may be supported so as to be rotatable with the supporting pin 25 as a fulcrum, and may be provided with a spring member different from the above plate, whereby the thin plate may be biased so as to move in direction (a). Alternatively, the restriction member 28 may be formed of: a slide member configured to move from a position of closing a path leading to the third groove 33 in the branched portion 34 to a position of opening the path; and a spring member configured to bias the slide member in a direction of the closing. However, preferably, the restriction portion 28c of the restriction member 28 is readily elastically deformable so that the projection 42 pushes the restriction member 28 and readily returns to the first groove 31 in the state as illustrated in FIG. 5.

In the present disclosure, the deformable or movable restriction member is provided in the branched portion in which the second groove and the third groove are branched from the first groove. The deformable or movable restriction member is configured to restrict the movement of the advancing projection from the first groove to the third groove, and guide the advancing projection from the first groove to the second groove. Therefore, the projection can be reliably guided into the locking recess. When the projection exits the locking recess and moves backward in the third groove, the restriction member can be deformed or moved to enable the projection return to the first groove. Because no step is formed on the bottom surface of the cam groove, it is possible to eliminate an impact sound that would be generated if there was a step through which the projection passes. In addition, because there is no need to excessively press the projection against the cam groove, abrasion of the cam groove is readily prevented.

What is claimed is:

1. A guide cam device, comprising:
   a cam groove;
   a projection; and
   a restriction member, wherein the cam groove includes
      a first groove, a second groove, and a third groove, the second groove and the third groove branching forward from the first groove, and
      a locking recess positioned between a forward end of the second groove and a forward end of the third groove,
   the projection is configured to move forward and backward in the cam groove and enter a locked state upon entering the locking recess,
   the restriction member is configured to inhibit entry of the projection from the first groove to the third groove and permit the projection to advance from the first groove to the second groove, and
   in response to being pushed by the projection that exits the locking recess and moves backward in the third groove, the restriction member is deformed or moved to enable the projection to move to the first groove,
   wherein
   the first groove and the third groove form a single continuous straight line, and
   the second groove includes an inclined portion that is inclined in a direction away from the third groove as the projection advances.

2. The guide cam device according to claim 1, further comprising a torsion spring member that is configured to apply a biasing force to the cam groove or the projection in a direction in which the projection is pushed from the second groove toward the third groove.

3. The guide cam device according to claim 1, wherein the restriction member is an elastically deformable spring member.

4. The guide cam device according to claim 1, wherein no step is formed on a bottom surface of the cam groove.

5. An on-board device, comprising:
a stationary portion;
a movable portion, and
the guide cam device of claim 1 between the stationary portion and the movable portion, wherein
the movable portion is movable forward and backward along the stationary portion, and
in response to the movable portion moving forward, the projection enters the locking recess and the movable portion enters a locked state.

6. The guide cam device according to claim 1, wherein the cam further includes an advancing path inclined portion and a receding path inclined portion between the second grove and the third grove, and
the locking recess is formed by merging the advancing path inclined portion and the receding path inclined portion with an angle without a concave portion at the locking recess in a direction perpendicular to moving directions of the projection in the advancing path inclined portion and the receding path inclined portion.

* * * * *